United States Patent [19]

Salter

[11] 4,110,631

[45] Aug. 29, 1978

[54] WIND-DRIVEN GENERATOR

[75] Inventor: Edmund L. Salter, San Diego, Calif.

[73] Assignee: Wind Power Systems, Inc., San Diego, Calif.

[21] Appl. No.: 638,605

[22] Filed: Dec. 8, 1975

Related U.S. Application Data

[63] Continuation-in-part of Ser. No. 489,190, Jul. 17, 1974, abandoned.

[51] Int. Cl.² .............................................. F03D 9/00
[52] U.S. Cl. ...................................... 290/55; 416/121; 416/170 R; 416/189; 416/DIG. 4
[58] Field of Search ...................... 290/43, 44, 54, 55; 415/2, 3, 4; 416/9, 41, 135

[56]  References Cited

U.S. PATENT DOCUMENTS

| 766,219 | 8/1904 | Clemson | 415/4 |
|---|---|---|---|
| 924,060 | 6/1909 | Hards | 415/122 |
| 1,698,709 | 1/1929 | Bucklen | 290/55 |
| 1,845,561 | 2/1932 | Runge | 415/122 |
| 1,877,622 | 9/1932 | Beard | 416/41 |
| 2,245,264 | 6/1941 | Dunn | 290/55 |

FOREIGN PATENT DOCUMENTS

| 117,764 | 11/1943 | Australia | 290/44 |
|---|---|---|---|
| 125,144 | 8/1947 | Australia | 290/55 |
| 480,989 | 5/1953 | Italy | 416/135 |

Primary Examiner—Robert K. Schaefer
Assistant Examiner—Eugene S. Indyk
Attorney, Agent, or Firm—Phillips, Moore, Weissenberger, Lempio & Majestic

[57] ABSTRACT

A wind-driven generator having a plurality of rotors each having a rim in frictional engagement with a power take-off drum which is mounted on the shaft of an electrical generator, and in which the rotor rims are pressed against the drum by the wind force on the rotors and with a reduced force which varies as a positive function of the wind force.

30 Claims, 17 Drawing Figures

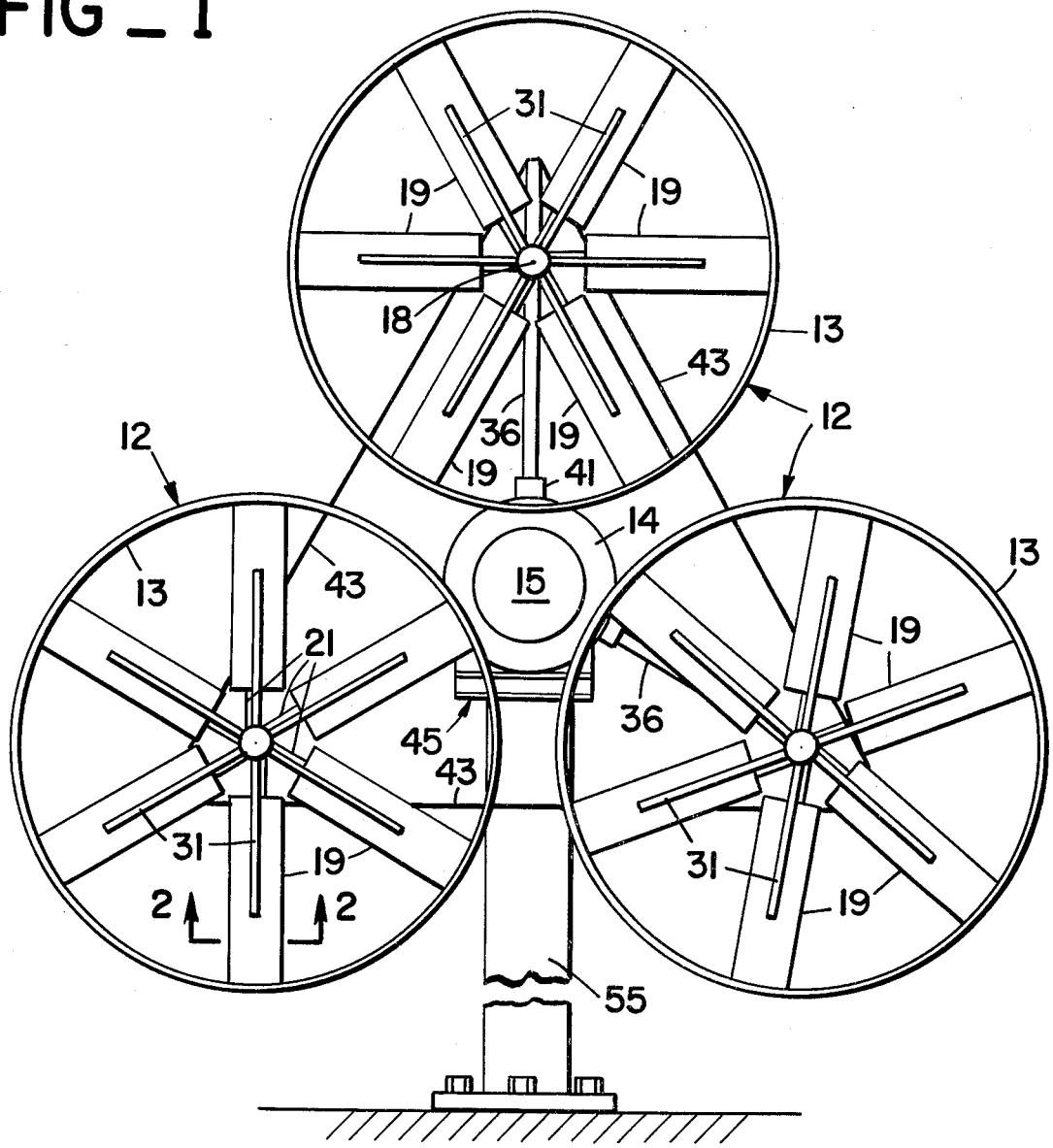
FIG_1
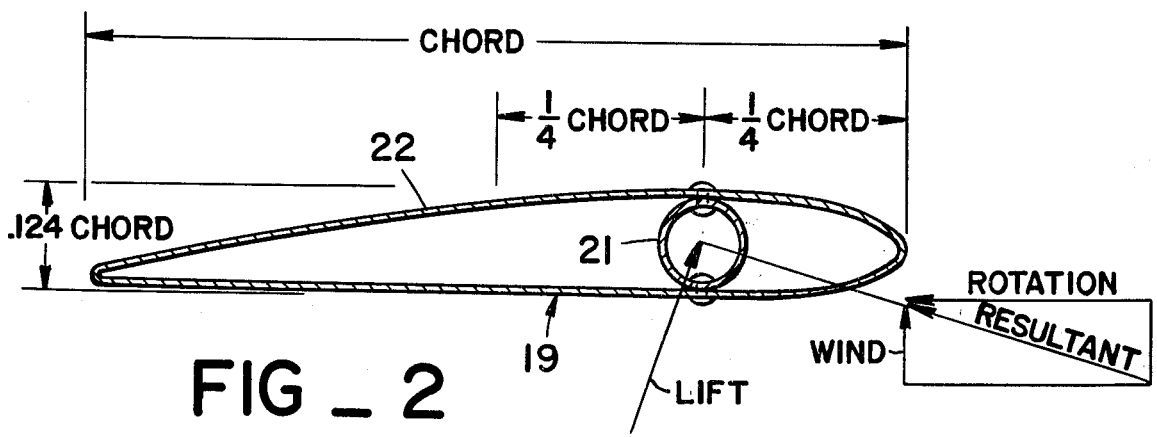
FIG_2

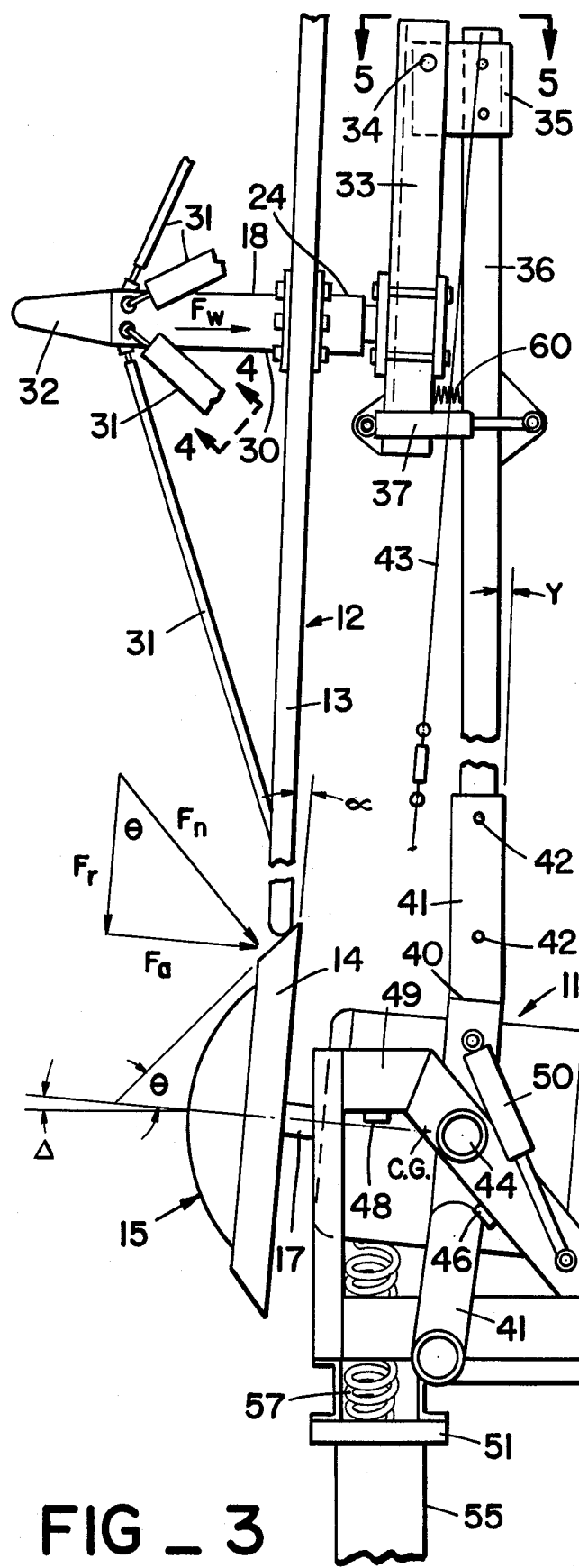

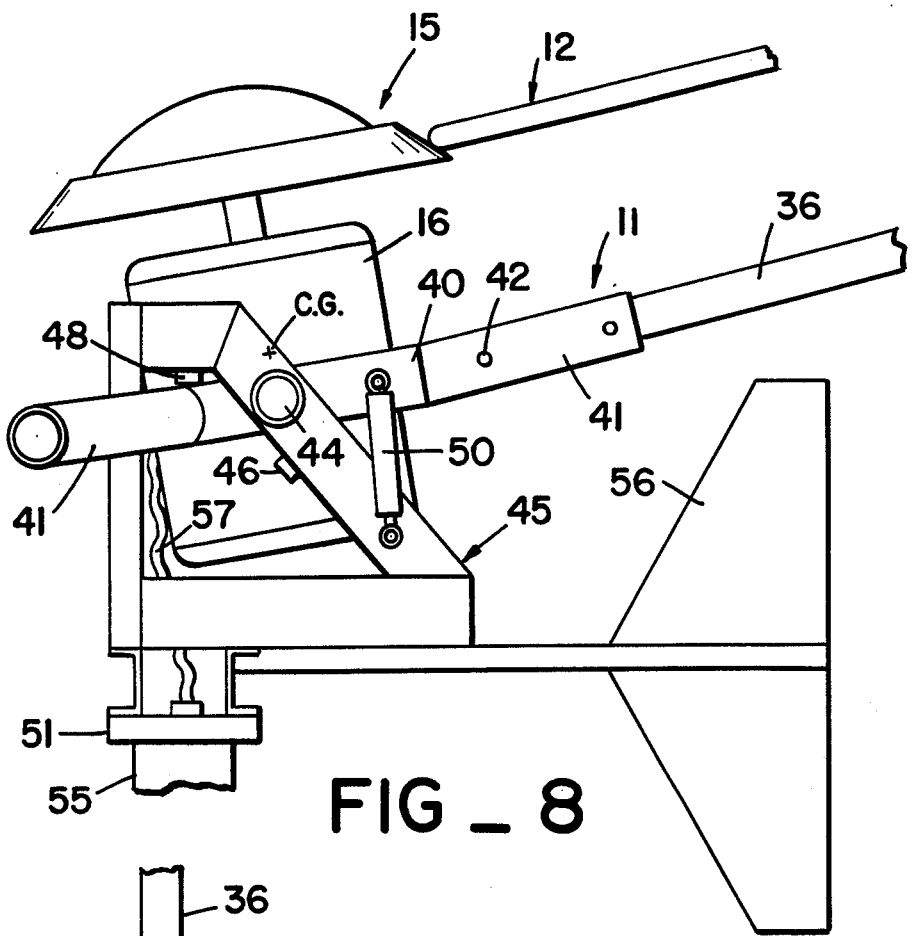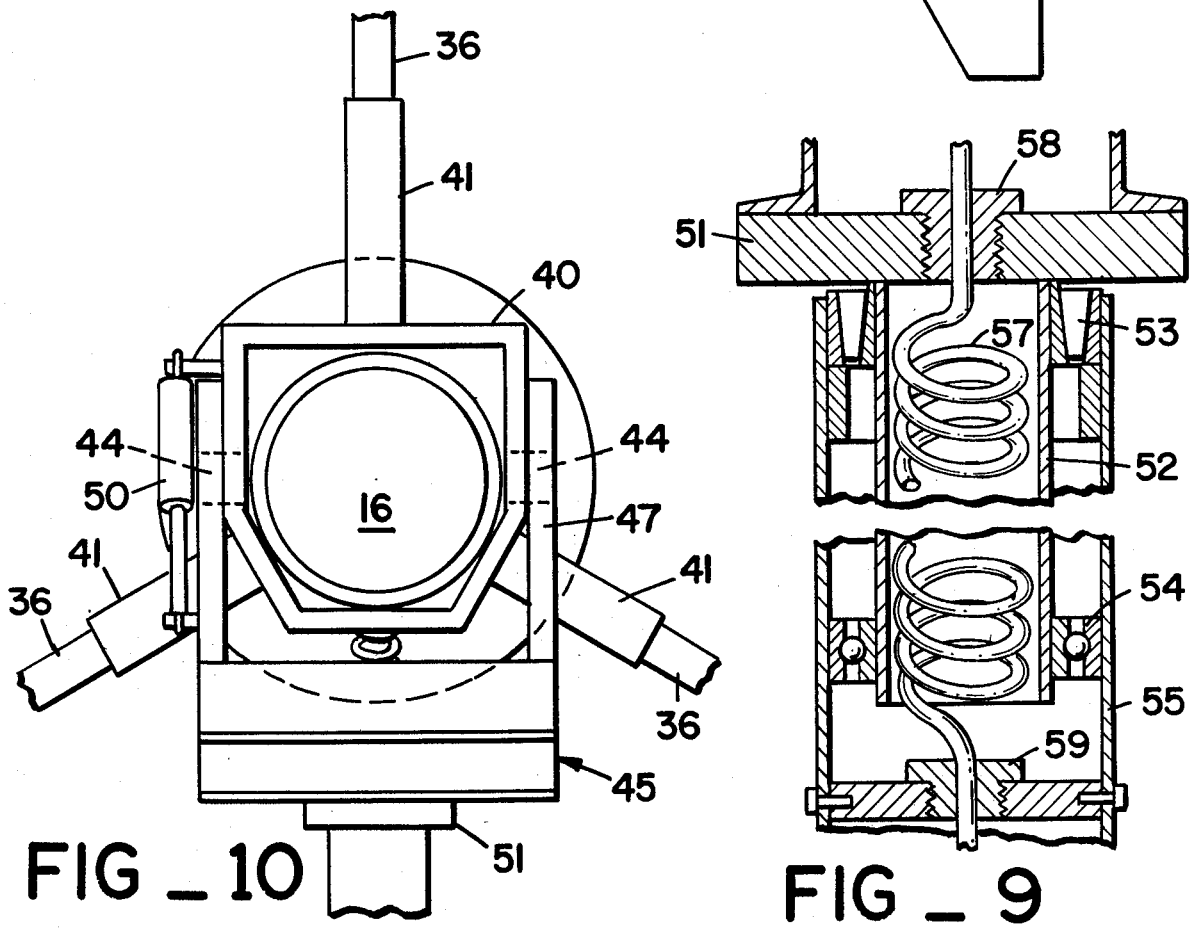

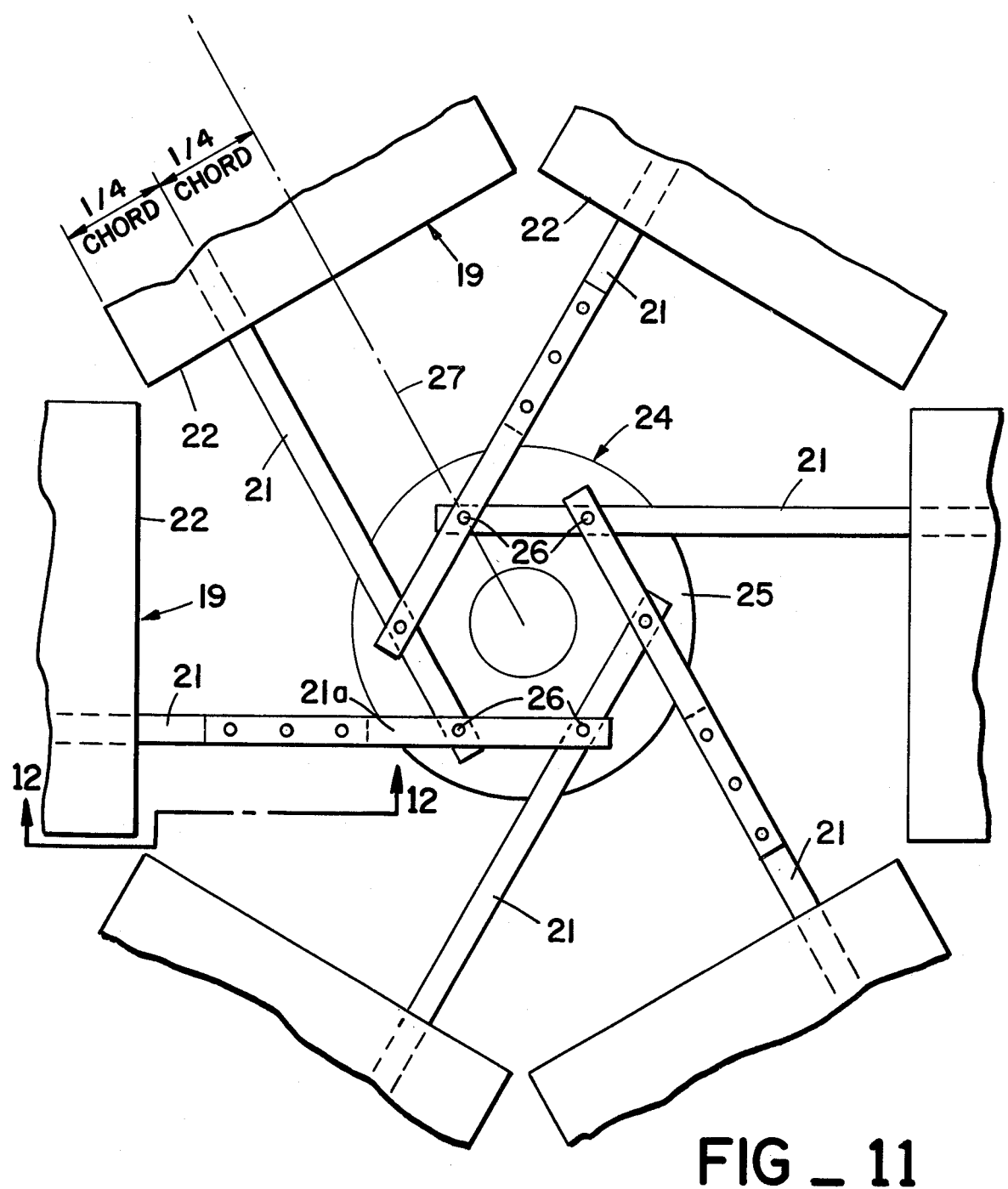
FIG _ 11
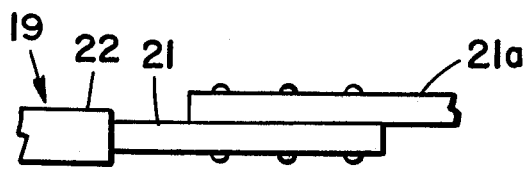
FIG _ 12

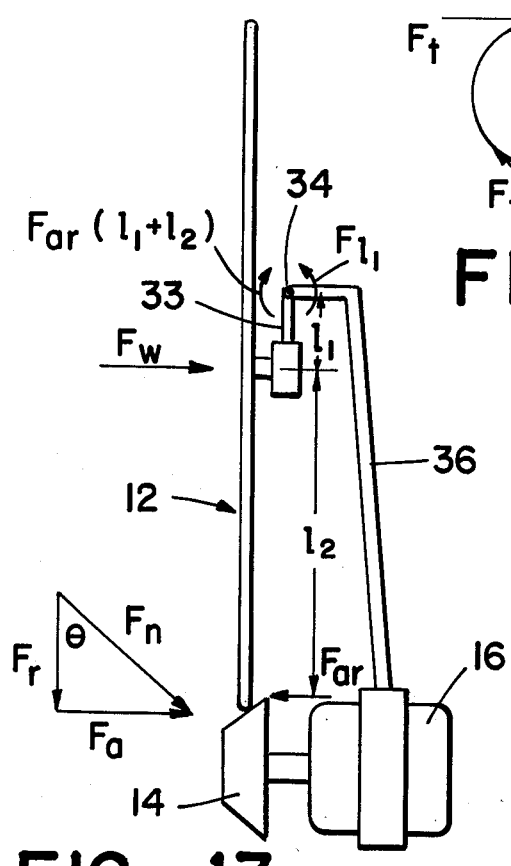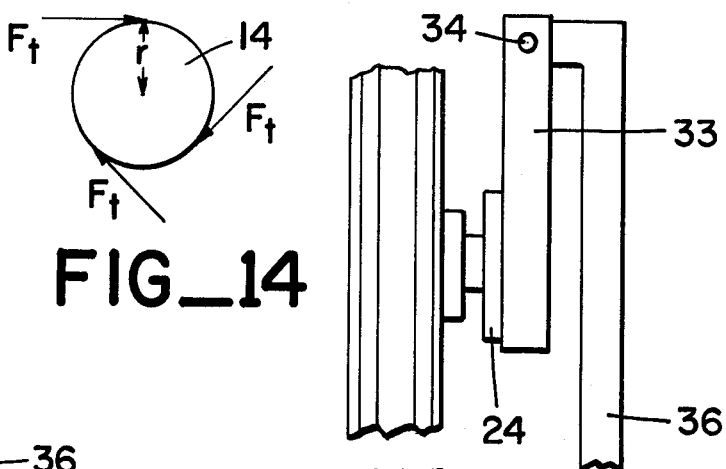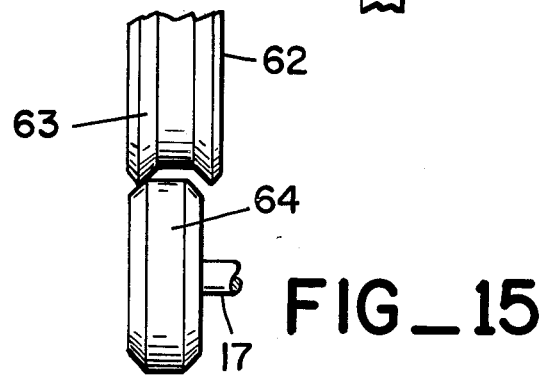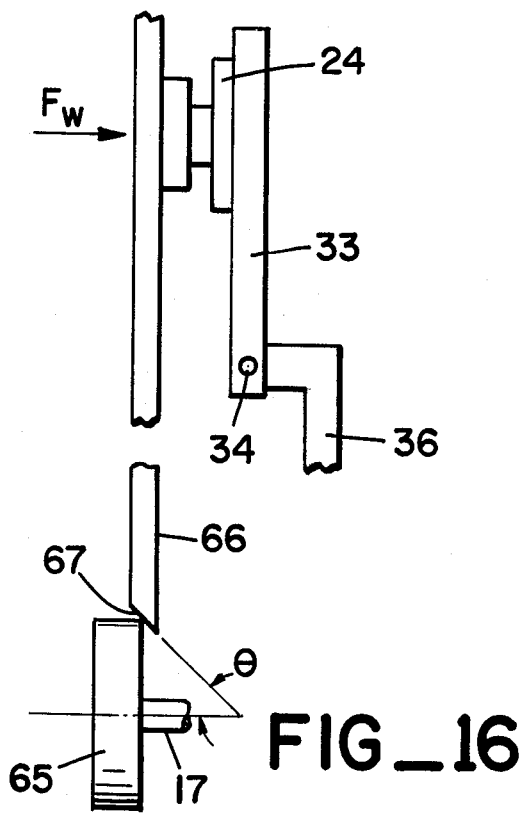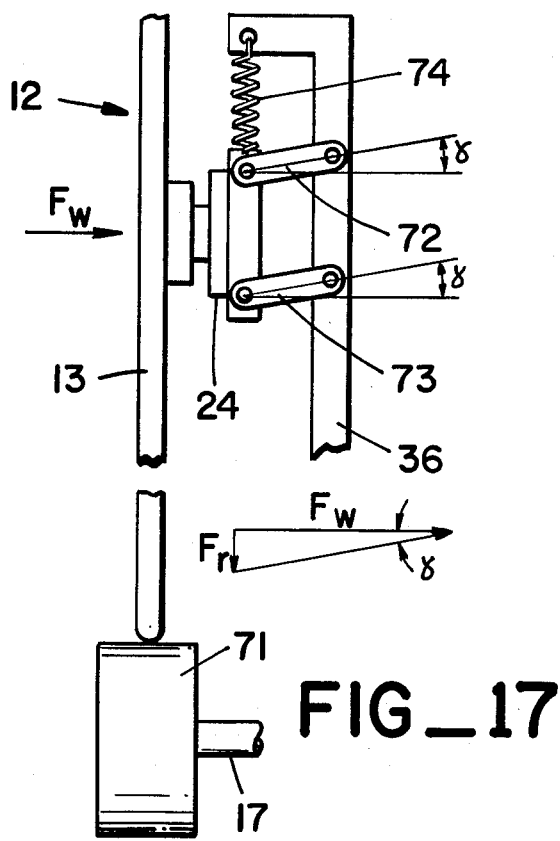

WIND-DRIVEN GENERATOR

CROSS-REFERENCE TO RELATED APPLICATION

This application is a continuation-in-part of my co-pending application Ser. No. 489,190, filed July 17, 1974, now abandoned, and entitled "WIND DRIVEN MOTOR."

BACKGROUND OF THE INVENTION

This invention relates to wind-driven generators.

The extraction of energy from the wind is an ancient art. Perhaps the first attempts at harnessing the power of wind were the primitive horizontal windmills of 10th century Persia. Throughout the following centuries may refinements and improvements have been made in this field to obtain a more efficient conversion of wind force to usable mechanical energy.

Following the development of electrical generators many efforts have been made to use wind power to drive electrical generators and thus convert wind force directly electrical energy. A complete wind-driven generator system consists of a rotor system which will be rotatably driven by the wind, an electrical generator, a mechanical power transmission coupling the rotor system to the generator and an electrical system for storing electric energy when generated and/or distributing such energy to point of use.

Several fundamental principles govern the design of wind-driven generators. The actual power available from the wind is proportional to the cube of the wind speed. If the wind speed is doubled, eight times as much power is available. It is also theoretically impossible in an open-air windplant to recover more than 59.26% of the kinetic energy of the wind. Thus, if the rotor itself is 75% efficient and the generator is 75% efficient, then no more than 33.34% of the wind energy can be converted to electricity. This amount of energy will be further decreased by the efficiency of the mechanical transmission between the rotor and generator. A further important factor is that the amount of energy that can be captured is dependent on the disk area swept by the rotors.

Considerable work has been done in the air foil design of wind-driven rotors to increase the efficiency thereof. A wind-driven rotor is characterized by its "tip-speed ratio," which is the ratio of the peripheral speed of the blade tips to the wind speed at maximum power. For example, a rotor having a tip-speed ratio of six will have a peripheral speed of 150 miles per hour inn a 25-miles-per-hour wind when full power is being generated. The tip speed usually doubles when the load is removed from the rotor, and in the case above, the peripheral tip speed would increase to 300 miles per hour. A typical low-tip speed ratio rotor is the familiar multi-blade wind pump, which has a tip-speed ratio of about one. These machines are not suitable for generating electricity due to their low efficiency and slow speed, but perform very well in the operation of piston pumps, due to their high starting torque and lack of dependence on sophisticated feathering devices.

A considerable challenge to the designer of a wind-driven generator system is the choice of tip-speed ratio of the rotor system with relation to the operating speed of the electric generator. Conventional generators or alternators are readily available but are designed for rotational speed of 1200–1800 rpm. Special low-speed generators are available but are considerably more expensive.

For a given diameter rotor, the rotational speed of the rotor will be proportional to its tip-speed ratio at any wind speed below that at which a speed governor comes into operation. If a low-speed ratio is used, then the speed of rotation will be low. In order for the generator to be driven at the desired high speed either a complex and costly gearbox or a costly low-speed generator will be required. On the other hand, if a high tip-speed ratio is selected to reduce the step-up gearing requirements then costly mechanisms will be required to feather the rotor blades in high winds to keep the rotor from exploding.

The greatest rate of movement of a rotor is, of course, present in the outer extremity of the rotor. In an effort to reduce the gearing requirements, attempts have been made to put a rim around the rotor and extract the power through belts, chains or gears. However, none of these appear to have been successful, and none are commercially available. The reason for this is that the aerodynamic and frictional losses associated with belt or chain drives are prohibitive, and there is no economic advantage to forming gear teeth on the rotor periphery.

SUMMARY OF THE INVENTION

As mentioned above, rim drives have been unsuccessful in wind-driven generators. The present invention utilizes a friction drive, wherein the rotor rims are pressed against a power take-off drum so that rotation of the rotors will drive the drum by the frictional engagement therebetween. The gear ratio obtained is simply the ratio of the diameters of the rotors to the diameter of the drum which is attached to the generator shaft.

The force imparted to the rotor by the wind and thus the available torque from the rotor is proportional to the square of the windspeed. The rotational speed of the rotor will be proporational to the windspeed. Since the power available from the rotor is equal to its torque times its rotational speed, the power available will vary as the cube of the windspeed.

The problem with transmitting the power of the rotor to the generator is that the maximum torque, $T_{max}$, which can be transmitted from the rotor rims to the take-off drum is limited as follows:

$$T_{max} = \mu F_n F$$

where $\mu$ = the coefficient of friction between a rotor rim and the drum, $F_n$ = the perpendicular force between rotor rim and drum, and $N$ = the number of rims acting on the drum.

If $F_n$ is essentially constant, as would be the case if a spring or weight were used to press the rim against the drum, then slipping of the rim on the drum will occur if this torque value is exceeded. Thus, if $F_n$ is constant, its value should be chosen so that it is sufficiently high that no sippage will occur at the highest windpseed at which the system is to operate. However, very low efficiency will result in light or moderate speeds when much less torque is to be transmitted because of the high pressure between the rim and the drum. Further, because of the low starting torque of the rotors, very high winds would be needed to provide sufficient torque to start the rotors turning to overcome the frictional resistance to motion imposed on the system at rest by the high $E_n$.

The present invention overcomes this problem by automatically varying the value of $F_n$ so that $F_n$ is proportional to the torque to be transmitted. Thus, $F_n$ is substantially zero when no torque is present. As the torque increases, $F_n$ is increased in the correct amount to prevent slippage while not creating undue, energy-wasting pressure between the rims and the drum.

This is accomplished as follows. Since the torque to be transmitted varies as the square of the windspeed, then the value of $F_n$ should likewise vary as the square of the windspeed. The wind load on a rotor also varies as the square of the windspeed. Accordingly, a fixed percentage of the wind load on a rotor is used for pressing the rotor rim against the drum, so that $F_n$ is then proportional to the torque to be transmitted.

Specific manners of accomplishing the above and maximizing the efficiency of wind-driven generators are set forth in the course of the following detailed description.

BRIEF DESCRIPTION OF THE DRAWINGS

Referring now to the drawings, wherein like parts are designated by like reference numerals throughout the same, FIG. 1 is a front elevational view of a wind-driven generator constructed in accordance with the present invention;

FIG. 2 is a cross-sectional view of one of the air-foil-shaped blades, taken on line 2—2 of FIG. 1;

FIG. 3 is a side elevational view of the device of FIG. 1, but showing only one of the rotors thereof;

FIG. 4 is a cross-sectional view of a truing strut, taken on line 4—4 of FIG. 3;

FIG. 5 is a detail view of the end of one of the rotor support arms, as seen from line 5—5 of FIG. 3;

FIG. 6 is a detail sectional view showing the mounting of the spar tube of a blade to the rotor rim;

FIG. 7 is a view showing the preferred skewing of a rotor axis relative to the axis of the power take-off drum;

FIG. 8 is a view similar to FIG. 3, showing the feathering of the rotors during strong winds;

FIG. 9 is a vertical cross section of the support column, showing the electrical power cable disposed therein;

FIG. 10 is a rear elevational view of a portion of the device of FIG. 1, showing the central frame member and cradle support therefor;

FIG. 11 is a front view of the hub assembly with forward tube and bolts removed to illustrate the manner in which the blades are connected to the hub;

FIG. 12 is a detail view, seen from line 12—12 of FIG. 11, of the spar tubes;

FIG. 13 is a diagrammatic illustration of the forces involved in the system of FIGS. 1-12;

FIG. 14 is a diagrammatic view of the tangential forces of the take-off drum of the system of FIGS. 1-12;

FIGS. 15-17 are elevational simplified views illustrating alternative rim drive arrangements wherein the pressure of the rim against the drum will vary in accordance with changes in wind velocity.

DESCRIPTION OF THE PREFERRED EMBODIMENTS

Referring now to the drawings, FIGS. 1-12 illustrate a preferred embodiment of the invention, wherein frame 11 has three identical rotors 12 mounted for individual rotation thereon, the rotors being forwardly faced with their upwind side toward the wind to intercept the wind and be driven thereby. The rims 13 of the rotor are in frictional engagement with a peripheral surface 14 of the central power takeoff drum 15, so that rotor rotation will drive the drum 15 and thereby drive the electric generator 16 which is directly connected by shaft 17 to drum 15. The peripheral surface 14 of drum 15 is preferably coated with a rubberized compound to provide a high coefficient of friction between the rotor rims and the drum.

Preferably three rotors are used since this will provide the most compact and efficient arrangement, while giving the desired step-up ratio of rotor to drum rotation. Two rotors could be used, but the cost per unit of generated electricity would be increased. Four or more rotors could be used, but the ratio of rotor to drum diameters would have to be reduced for the drum to be directly driven by all of the rotor rims. In any event, since the rotors exert a radial thrust on the drum, the rotors should be arranged relative to the drum so that the rotor rims engage the drum at equidistant points therearound to balance out the radial thrusts.

Each rotor has a central hub 18 coaxial with its rim 13 and a plurality of blades 19 extending from the hub radially out to the rim 13. The blades are conventionally shaped airfoils and preferably have a tip-speed ratio of about 4 under full load. Preferably six blades are used, since the rotor will be made sufficiently rigid by that number of foils and a greater number of blades will increase the cost without providing a commensurate increase in efficiency. In the preferred construction each airfoil comprises a steel spar tube 21 and a sleeve 22 of thin-gauge aircraft aluminum riveted to the spar tube, the sleeve having an airfoil shape.

The rotor hub 18 is rotatably mounted on the frame by bearing assembly 24. Conveniently, a standard six-bolt front hub and bearing assembly from a light utility truck can be used for the rotor hub and bearing. As shown in FIG. 11, the spar tubes 21 of the six blades 19 are mounted on the six-bolt radial flange 25 of the hub, the flange having six holes equidistant from each other and from the axis of the hub. As is seen, each spar tube is rigidly secured by two bolts 26 to the flange 25 in offset relation to the hub axis so that a line 27 parallel to the spar tube and passing through the hub axis will pass through the blade midway between its forward and leading edges for a purpose to be described below. Also as is seen, every other spar tube rests flat against flange 25 while the other spar tubes rest on the first set of tubes, thereby enabling the six bolts 26 to hold all of the six blades in place, with two bolts being used for each spar tube. Each of these other spar tubes has an offset tube 21a riveted thereto so that the blades will lie in a common plane.

Each rotor rim 13 is preferably smooth and circular in radial cross section so as to provide the least wind resistance. As shown in FIG. 6, the spar tubes 21 are rigidly connected to the rim 13 by bolt 27 which extends through bushing 28 disposed inside of the rim and screws into nut 29 fixed in the end of spar tube 21.

The rotor hub 18 has a forward portion 30 extending forwardly of the plane of the rim 13 and on which streamlined struts 31 are secured, these struts extending radially outwardly and rearwardly to the blades 19 to provide means for rigidifying and truing the rotor, and thereby supporting the rim against deflection from the wind loads on the blades. Preferably these struts connect to the blades at their center of pressure, i.e., ⅜ of the distance from the rotor axis to the rim, to best support this wind load. Also preferably, and as shown in FIG. 4, the struts 31 each comprise a spar tube 31a and an airfoil-shaped body 31b secured thereto. Although these small struts will intercept some of the wind that would otherwise reach the blades 19, the airfoil shape of the struts will utilize the wind impinging on them to assist in driving the rotor. If desired, the rigidifying and truing means could, instead of the above-described struts, be guy wires extending from the forward end of hub portion 30 to the blades or the rim.

The extreme forward end 32 of hub 18 is shaped to deflect wind intercepted thereby outwardly from the hub to impinge upon the blades outwardly of the rotor axis and thereby increase the efficiency of the system.

The rotor bearing assembly 24 is mounted on lever arm 33 which is pivotally mounted by hinge pin 34 to channel 35 fixed to support arm 36 of frame 11. By this arrangement, the rotor bearing is free to move forwardly and rearwardly relative to the frame so that the rotor hub and rotor, which move axially with the bearing, will also be free to move forwardly and rearwardly relative to the frame.

In order to prevent a sudden decrease in wind from causing the rotor rim to spring forward and lose contact with the drum, and to prevent bouncing of the rim against the drum, a damper 37 is connected between lever arm 33 and support arm 36 to damp both forward and rearward movement of lever arm 33. A hydraulic or pneumatic damper may be used for this purpose and, conveniently, an automobile shock absorber may be so used.

Rotation and precession of the rotor will impose a gyroscopic torque on lever arm 33 which must be restrained so that the proper angle between the rotor rim and take-off drum is maintained. Precession will be present when the machine is rotating about a vertical axis to follow changes in wind direction. As shown in FIG. 5, this may be accomplished by making the lever arm 33 channel-shaped so that its sides 38 engage the sides 39 of support arm channel 35. The lever arm 33 can thus pivot about hinge pin 34 while being restrained against twisting relative to support arm 36. The diameter of the support arm is chosen so that the arm has sufficient rigidity to resist twisting under the maximum magnitude of wind expected.

The frame 11 includes a central yoke 40 having a plurality of elongated sockets 41 secured thereto. Support arms 36 fit within these sockets and can rotate therein for adjustment purposes. Once adjusted, the support arms can be locked against rotation by set screws 42. Sockets 41 and the support arms 36 therein are inclined forwardly by an angle $\gamma$, preferably about 5°, so that the outer ends of the support arm are forward of the yoke. Tension cables 43 extend between the outer ends of the support arms to rigidify the support arms and restrain them against rearward movement from the wind force imposed thereon. The central yoke 40 rigidly supports the generator 16 centrally thereof.

In order to provide for feathering of the rotors in high winds, the central yoke 40 is mounted by horizontal trunnions 44 in cradle 45 for pivotal movement about the axis of the trunnions. When the rotors are in their normal position, as shown in FIG. 3, the lower sockets 41 will engage stop member pads 46 on the upwardly inclined cradle arms 47 and hold yoke 40 so that the axis of the take-off drum and rotor assembly is inclined upwardly into the wind by an angle $\Delta$, preferably about 5°, for maximum wind-gathering efficiency. In this disposition, the axis of trunnions 44 is below the center of the drum 15. The combined wind force on all of the rotors will produce a resultant horizontal thrust on the system which passes through the center of drum 15 and above the axis of trunnions 44. Thus the wind force will tend to rotate the system in a clockwise direction (as seen in FIG. 3). When the wind force is sufficiently great as to overcome the weight of the system, yoke 40 and all elements supported thereby will pivot about trunnions 44 approximately 75° until the lower support arms 36 come into engagement with the stop member pads 48 on the upper horizontal arms of cradle 45, as shown in FIG. 8. With the rotors now in generally horizontal position the foils will be effectively "feathered" against the wind. The amount of wind force required to pivot the system to feathered position will depend on the weight of the system and the distance of the center of gravity forwardly of the trunnions 44. These parameters can be chosen so that feathering will occur at a given wind velocity.

As will be noted in FIG. 8, the center of gravity in feathered position is forward of the axis of trunnions 44 so that when the wind speed decreases, the system will automatically restore itself to the normal position of FIG. 3. In order to prevent damage to the system, a damper 50 is connected between the central frame member 40 and cradle 45 to allow free movement of the system to feathered position while retarding return movement to normal position.

Cradle 45 has secured to the bottom thereof mounting flange 51 and a vertical tube 52 depending therefrom. Roller bearing 53 and ball bearing 54 support the cradle and tube 52 for rotation about a vertical axis within outer tubular support column 55. The support column 56 is fixed to any desired surface or to the top of a mast. Tail vane 56 on cradle 45 keeps the cradle and rotor system facing into the wind.

During normal operation of any wind-driven generator, the generator frame will oscillate about a vertical axis as the wind shifts, and at times will rotate completely around the vertical axis. A problem which has existed in wind-driven generators is the provision of a suitable electrical connection to the generator which will maintain electrical contact between the stationary mount and the rotatable frame carrying the generator. Typically, slip rings are used for this purpose, to allow any amount of rotary movement of the frame and generator without interruption of current therefrom. However, slip rings are disadvantageous for long, unattended outdoor use because of corrosion or other fouling of the slip ring contacts.

I have found from study of prolonged operation of wind-driven generators that although the number of complete revolutions of the system due to wind shifts may be relatively great, these revolutions occur rather randomly, in both directions, and the cumulative number of complete revolutions in either direction from a zero reference point is surprisingly small. For example, in a 5-month observation period it was found that the greatest number of cumulative revolutions in either direction from the zero reference at the start was three revolutions. As a consequence, I have found that it is unnecessary to provide an electrical connection which will allow an unlimited number of complete revolutions in a given direction, and that it is only necessary to allow for a relatively small number of turns. An allowance for 10 revolutions in either direction will provide a suitable safety factor for all but quite unusual locations.

For these reasons, the cable 57 from the generator passes through packing nut 58 which clamps the cable to the cradle. The cable is then loosely helically coiled within the inner tube 52 and is clamped by packing nut 59 to the stationary outer support column 55 below the inner tube. The outer diameter of the cable coils is sufficiently less than the inner diameter of tube 52 so as to allow for expansion of the coils as the system rotates in a direction opposite to the direction of the coils. At the same time the clearance is sufficiently small so that the coils will not kink within the tube. The number of coils can be varied as desired and will depend to some degree on the distance between the packing nuts 58 and 59. I have found that 50 coil turns will allow 10 complete revolutions of the system in either direction without trouble. Preferably the inside of the inner tube is provided with a low-friction plastic coating. The cable is also loosely coiled between the upper packing nut 58 and the generator to allow the system to pivot between normal and feathered positions. Thus, by the above-described construction, no movable contacts are required and circuit integrity is maintained at all times.

OPERATION

Although the following description will apply in general to wind-driven generators embodying the present invention, the specific values mentioned below are those found from operation of a prototype system. This prototype employs three rotors, each 11.5 feet in diameter, having airfoil-shaped blades with a tip-speed ratio of 4 at full load, rim driving a power take-off drum 2 feet in diameter, i.e., a 5.75 step-up in angular rotation. In the prototype the blades are shaped as an NACA 4412 airfoil, and as seen in FIG. 2, the thickness of a blade 19 is equal to 0.124 of its chord length and the spar tube is centered at one-fourth of the chord length from the leading edge of the blade for the above-mentioned prototype. The chord length for this prototype is 7 inches. FIG. 2 also shows the effect of the wind on the blade, with the lift produced being normal to the resultant flow at the spar tube. By virtue of the previously described mounting shown in FIG. 10, the line 27 parallel to the spar tube and passing through the hub axis is spaced from the spar tube at a distance therefrom approximately one-fourth of the chord distance. This will minimize spanwise flow (along the length of the blade) which produces less power than chordwise flow and thus will maximize the power that the rotors may extract from the wind.

The generator used in the prototype is a standard four-pole, three-phase brushless alternator of approximately 10-kilowatt capacity. Normal operating speed of the alternator is 1500 rpm, but this speed is not reached until the wind speed is 26 mph. The voltage required to completely charge a 115-volt battery set is 130 volts d.c., with charging starting at slightly more than 115 volts d.c. Using the 220-volt a.c. windings, the "cut-in" speed, or the alternator speed at which charging begins is about 670 rpm, a value which may vary considerably depending on the state of charge of the battery bank.

With the rotor system in normal position, i.e., as in FIGS. 1 and 3, and with no wind, the rotors will be at rest, and the only pressure of the rotor rims against the take-off drum will be from the offset mounting of the rotors on hinge pins 34.

When wind starts blowing against the rotors, the resultant force $F_w$ on a rotor will be normal to the plane of the rotor and will be exerted axially of the rotor. This wind force will be resisted by forces at the hinge pin 34 and at the point where the rotor rim engages drum 15. The relative magnitude of these reactive forces will depend on the relative distances from the axis of the rotor to hinge pin 34 and drum 15. Since these distances are constant, the reactive force between the rotor rim and the drum is a constant percentage of the wind force on the rotor. The force at the interface of the rotor rim and drum will have an axial component $F_a$ parallel to the drum axis, a radial component $F_r$ perpendicular to the drum axis and a component $F_n$ perpendicular to the inclined peripheral surface 14 of the drum. Again, all of these components $F_a$, $F_r$ and $F_n$ will be a constant percentage of the wind force $F_w$ on the rotor and will vary directly therewith.

When the wind speed increases sufficiently to overcome the inertia and frictional resistance of the generator shaft, the rotors will begin rotating to drive the drum and generator shaft. At low speeds of generator shaft rotation no charging current will be delivered and there will be no load on the system except friction. Consequently, the rotor runs at a tip-speed ratio of about 8. As the wind speed increases, the generator speed increases accordingly until its cut-in speed is reached and the generator begins producing charging current. If this is at 670 rpm, a wind speed of 6 mph will be required.

With the production of charging current, the load on the system begins increasing, causing the tip-speed ratio to decrease and the efficiency to increase. With about a 12 mph wind speed, the system is fully loaded, the tip-speed ratio becomes 4 and remains at that value for higher wind speeds.

As the wind varies in the full load range of about 12-30 mph, the wind force on and torque of the rotor will vary in accordance with the square of the wind speed. However, the value of $F_n$ will also vary in accordance with the square of the wind speed so that the torque available will be transmitted, without slippage loss, to the generator shaft.

In order to provide for maximum efficiency in power transmission from the rotor rims to the take-off drum, I have found that the angle $\theta$ of inclination of the peripheral drum surface 14 to the drum axis should be approximately 55°. If the angle is appreciably less, then the rotor rims will ride up on the drum surface, wedging the rotor rims on the drum and producing undesirably high axial crushing thrust on the rotor rims. If the angle $\theta$ is appreciably greater, the magnitude of the force component $F_n$ will be reduced. Also, the area of contact between the rotor rims and the drum will be increased and there will be an undesirable increase in the "scrubbing" contact therebetween, resulting from the unequal diameters of the rotor and drum.

Also, the plane of the rotor should be inclined by an angle $\alpha$ to a radial plane of the rotor to produce the least energy-wasting scrubbing between the rotor rims and drum. In practice the optimum value of this angle $\alpha$ is approximately 3°.

Further, the axis of the rotor should be skewed, or twisted, relative to the drum axis by an angle $\beta$ so that the skew angle will tend to make the rims run downhill on the drum, thereby avoiding the crushing problem two paragraphs above. In practice, it has been found that the optimum value of this angle $\beta$ is approximately 1°. This angle can be obtained by rotatably adjusting the support arms 36 about their axes in the sockets 41 and by then locking the support arms in the adjusted position.

In the system thus far described, the mounting system for the rotor will cause a small force to be exerted by the rotor rim on the drum, due to the suspended weight of the rotor, when there is no wind and the system is at rest. Accordingly, when a wind exists, the wind must increase to a value sufficient to overcome the inertia of the drum and generator system in order for the rotor to begin turning.

If desired, a spring 60 may be disposed between lever arm 33 and shaft 36 to provide a light counterbalance force to hold the rotor rim slightly away from the drum when there is no wind. This will allow the rotor to begin turning more easily at very low wind speeds since the inertia of the generator assembly need not then be overcome. An increase of wind speed and wind load will then press the rotor rearwardly against the bias of the spring 60 so that the rotor rim will engage the drum surface. The inertia of the rotating rim will then be utilized to overcome the inertia of the drum and generator system so that they will rotate together. Once contact is made between the rotor rim and drum there will be no further deflection of spring 60 and it will have no appreciable effect on the system as wind speeds increse.

The optimal length of the lever arm 33, from the rotor hub to hinge pin 34, is determined from the parameters of the system as follows. With reference to FIGS. 13 and 14, $l_1$ is the length of the lever arm 33 and $l_2$ is the distance from the rotor hub to the contact point of the rotor rim and drum 14, i.e., $l_2$ is equal to the radius of the rotor.

The horsepower (H.P.) that is delivered to generator 16 is equal to:

$$\frac{2\pi (RPM) T}{33,000}$$

where RPM is the rotational speed of shaft 17 and $T$ is the torque delivered to the shaft. Torque $T$ is equal to $NF_t d$, where N is the number of rotors, $F_t$ is the tangential force delivered to the drum by each rotor rim and $d$ is the radius of the drum at the point wherein the rotor rims engage the drum. $F_t$ is equal to $\mu F_n$, where $\mu$ is the coefficient of friction between a rotor rim and the drum and $F_n$ is the perpendicular force between the rotor rim and drum. $F_a$ is equal to $F_n \sin \theta$, where $F_a$ is the force component parallel to the drum axis. Accordingly, $$F_a = \frac{33,000 \text{ (HP) } \sin \theta}{2\pi (RPM) N \mu d}$$

The generator 16 of the previously referred-to prototype has a maximum power output of 14 hp when the shaft 17 is driven at a speed of 1600 rpm, a speed which is obtained when the rotors are driven by a 25 mph wind.

In the prototype, $\theta = 65°$, N = 3 and $d$ = 1 foot. Assuming a worst case condition of $\mu = 0.5$ (under wet conditions), the previous equation shows $F_a$ to equal 25 pounds when the wind velocity is 25 miles per hour. At 25 mph an increase of $F_a$ will not cause any increase in delivered torque to shaft 17 and indeed will lower the efficiency of the system because of the extra, unneeded force imposed on the drum. If $F_a$ is decreased from this value at this wind speed, unwanted slippage between the rotor rims and drum will occur.

Having determined the optimum value of $F_a$ for the system when operating at the wind velocity which will produce maximum output for the generator, the length of lever arm 33 is chosen so that the wind load $F_w$ acting axially on the rotor at that wind speed will produce the desired force $F_a$ to press the rotor rim against the drum.

The torque on hinge pin 35 produced by the wind load $F_w$ is equal to $F_w(l_1)$ and is balanced by a torque equal to $F_{ar}(l_1 + l_2)$, where $F_{ar}$ is a reaction force equal and opposite to $F_a$, i.e., $F_w(l_1) = F_{ar}(l_1 + l_2)$. Accordingly, $$l_1 = \frac{F_{ar}(l_2)}{F_w - F_{ar}}$$

Data show that the wind load $F_w$ on a rotor of the previously described embodiment is 140 pounds when the wind velocity is 25 mph. Since $l_2$ is 5.75 feet and the desired $F_a$ is 25 pounds, $l_1$ = 1.25 feet. With this length $l_1$ for lever arm 33, a force reduction is obtained so that $F_a$ = 18% $F_w$.

If the wind speed reduces by one-half, to 12.5 mph, the speed of the rotors and the speed of the generator shaft will reduce, by one-half, to 800 rpm. Since $$HP = \frac{Nd(2\pi)(RPM)F_t}{33,000},$$

and since the power output of the generator will vary as the cube of the wind speed, the output of the generator will be reduced to 1.75 hp and $F_t$ will equal 3.8 pounds per rotor. From the geometry of the syste, a force $F_a$ of 6.25 pounds will be required to produce a force $F_t$ of 3.8 pounds. The wind force $F_w$ varies as the square of the wind velocity, and accordingly, at a wind speed of 12.5 mph, $F_w$ will equal 35 pounds. Since $l_1$ and $l_2$ are fixed distances, $F_a$ will still equal 18% of $F_w$, and the wind load of 35 pounds ($F_w$) will accordingly produce a force $F_a$ of 6.25 pounds.

Thus, with the matching of $F_w$ to $F_a$ by the constant percentage reduction of $F_w$ resulting from the choice of length $l_1$ relative to $l_2$, $F_a$ will be a reduced force that varies as a positive function of $F_w$ so that the force $F_n$ will vary in accordance with wind speed and will be a proper amount to transmit all power available to the generator shaft at all wind speeds without slipping and without excessive loading which wastes power and wears out components prematurely.

In operation, the rotor rims serve several purposes. They, of course, are used to drive the take-off drum. Also, their inertia effect due to the disposition of their weight at the outer perimeter of the rotors will increase the flywheel action of the rotors so that they will continue to rotate in spite of sudden wind lulls. A smooth, circular in radial cross-section, shape of the rotors will have a minimum drag and thus a maximum efficiency.

If in operation there is a sudden decrease in wind velocity, the force $F_n$ will decrease correspondingly and slippage of the rotor rims on the drum would result. This is undesirable since there will be undue wear on the system as the rotor and generator re-establish proper force transmission therebetween. This is avoided in the present invention by the dampers 37 which hold the rotor rims in proper pressure engagement with the drum while allowing a gradual reduction in pressure therebetween upon a sudden decrease in wind velocity so that the rotor and generator speeds will not be mismatched.

If the wind speed becomes too great, the force on the rotors can cause them to rotate at a destructive rate. In order to safeguard the rotors the system will automatically pivot to feathered position when the wind force reaches a high enough value to overcome the weight of the system. With the present prototype, such feathering movement will occur at a wind speed of about 30 mph, a speed well below the maximum speed that the rotors can safely stand. Although the wind force on the feathered rotors will be greatly reduced, only a relatively small force is required to hold them in feathered position since the center of gravity in feathered position is but slightly offset horizontally from the trunnion pivots. When the wind speed decreases to a safe value, the rotors will automatically restore themselves to operating position.

FIGS. 15-17 are simplified drawings of other arrangements whereby a percentage of the wind load on the rotors can be used to vary the pressure of the rotor rims on the power take-off drum so that efficiency in torque transmission can be maximized.

FIG. 15 differs essentially from what has been previously described in the shape of the rotor rim. In this case rotor rim 62 is channel-shaped and has an outwardly inclined flange 63 which is in frictional engagement with the power take-off drum 64. A conventional motorcycle tire has been found satisfactory for use as drum 64. As before, the pivotal support of the rotor bearing 24 will cause a fixed percentage of the wind load to provide the driving pressure between the rim and drum.

In FIG. 16, the lever arm 33 (on which rotor bearing 24 is mounted) is pivoted by hinge pin 34 to support arm 36 at a pivot point located between the rotor axis and the axis of take-off drum 65. As a consequence, wind force on the rotor will urge the rotor rim 66 forwardly against the drum. Again, this force will vary in accordance with changes in wind load. FIG. 14 also illustrates a modification wherein the rotor rim 66 has a peripheral surface 67 inclined at an angle $\theta$ of approximately 55° to the axis of drum 65, and wherein the drum is cylindrical in shape.

FIG. 17 illustrates yet another arrangement wherein a fixed percentage of the axial wind load on the rotor is used to press the rotor rim against the take-off drum 71. In this case the drum 71 is cylindrical and the rotor rim bears only radially on the drum. Rotor bearing 24 is mounted on support arm 36 by pivot links 72 and 73, which are inclined to the axis of the rotor by an angle $\gamma$. An axial wind force $F_w$ will produce rearward and downward forces on the rotor, the downward force $F_r$ being equal to $F_w \tan \gamma$. With a desired force reduction, wherein $F_r = 18\% F_w$, $\gamma$ will be 10.2°. Again, $F_n = \mu F_r$ and the proper amount of force will be transmitted without slipping and without excessive force being applied for all wind speeds. Spring 74 may be connected between the rotor and support arm 36 to counterbalance the weight of the rotor is that the pressure of the rotor against the drum is primarily derived from wind loading.

The system of FIG. 17 has an advantage over the systems previously described in that no axial loads are imposed on the drum and generator bearings. However, the system of FIG. 17 is considerably more sensitive to wind direction. If the direction of $F_w$ shifts by 10° from above or below the rotor axis the effective angle $\gamma$ between the links 72 and 73 and the direction of $F_w$ will vary from 0° to 20° so that the force $F_r$ will vary from 0 to 36% of $F_w$. Such variation of direction of $F_w$ in the previously described embodiments will have a relatively minor effect on the distance $l_1$ from the hinge pin 34 to the force $F_w$ acting through the rotor hub so that the percentage reduction of $F_w$ to $F_a$ will likewise be little affected.

What is claimed is:

1. In a wind-driven generator:
   (a) a frame;
   (b) a plurality of forwardly-facing wind-intercepting rotors, each having a hub, a circular rim coaxial with said hub and a plurality of blades extending radially from said hub to said rim;
   (c) a power take-off drum rotationally mounted on said frame, said drum having a peripheral surface, the rims of all of said rotors being in frictional engagement with said peripheral surface at points spaced equidistantly therearound;
   (d) means for rotatably mounting said rotors on said frame and for pressing the rotor rims against said drum in response to presence of force exerted upon the upwind side of said rotors and with a reduced force that varies as a positive function of said wind force.

2. Apparatus as set forth in claim 1, wherein said means (d) for each rotor includes a rotational bearing member for the hub, said bearing member being axially movable with said hub, and includes means mounting said bearing member on said frame for forward and rearward movement of said bearing member relative to said frame.

3. Apparatus as set forth in claim 2 wherein said means (d) further includes damper means connected between said bearing and said frame for yieldably retarding forward movement of said bearing relative to said frame.

4. Apparatus as set forth in claim 2 wherein each rim has a side surface therearound engageable with said peripheral surface of said drum, wherein at least one of said surfaces is inclined from its axis of rotation, and wherein at least part of the pressure on said drum by said rotor rims imposes an axial thrust on said drum.

5. Apparatus as set forth in claim 4 wherein said inclined surface is inclined at approximately 55° relative to the axis of said drum.

6. Apparatus as set forth in claim 4 wherein the axis of said rotor bearings are inclined relative to the axis of said drum by approximately 3°.

7. Apparatus as set forth in claim 4 wherein the axes of said rotor bearings are skewed relative to the axis of said drum by approximately 1°.

8. Apparatus as set forth in claim 4 wherein said frame comprises a central frame portion having a plurality of sockets fixed thereto and a plurality of elongated rotor-support arms, each arm being mounted in one of said sockets for adjustable rotation therein about the axis of said arm, said arms each extending outwardly from said central frame portion and supporting the rotor bearing of one of said rotors thereon, means for locking said arms in said sockets to prevent relative rotation therebetween, and means restraining each rotor bearing against twisting movement relative to the rotor-support arm on which it is mounted.

9. Apparatus as set forth in claim 4 wherein each said rotor bearing is pivotally mounted on said frame at a pivot point spaced outwardly from the axis of said drum and also spaced from the axis of said bearing.

10. Apparatus as set forth in claim 9 wherein said pivot point is spaced from said bearing axis in a direction away from said drum axis whereby wind force on said rotors will impose a rearward thrust on said drum.

11. Apparatus as set forth in claim 10 wherein said rims are circular in radial cross-section and wherein said peripheral surface of said drum is inclined outwardly and rearwardly.

12. Apparatus as set forth in claim 11 wherein said peripheral surface of said drum is inclined by approximately 55° relative to the axis of said drum, wherein the axes of said rotor bearings are inclined by approximately 3° and skewed by approximately 1° relative to the axis of said drum.

13. Apparatus as set forth in claim 1 wherein each said rim has a smooth outer periphery and said rim is circular in radial cross-section.

14. Apparatus as set forth in claim 1 wherein the hub of each rotor extends substantially forwardly of the plane of the rim associated therewith and wherein said hub has wind-deflecting means on the forward end thereof for deflecting wind substantially outwardly from said means to impinge upon said blades.

15. Apparatus as set forth in claim 1 wherein the hub of each rotor extends substantially forwardly of the plane of the rim associated therewith, and wherein said rotor includes rigidifying and truing means connected to and extending from the forward end of said hub outwardly and rearwardly thereof to outer portions of said rotor to restrain said rim against rearward deflection relative to said hub.

16. Apparatus as set forth in claim 15 wherein said rigidifying and truing means comprise a plurality of streamlined struts, one for each blade.

17. Apparatus as set forth in claim 15 wherein said rigidifying and truing means extend outwardly and rearwardly and connect to said blades at the center of pressure thereof.

18. Apparatus as set forth in claim 15, and further including wind-deflecting means on the forward end of said hub for deflecting wind outwardly from said means to impinge upon said blades.

19. Apparatus as set forth in claim 1, wherein said frame comprises a central frame portion supporting said drum and located therebehind, and a plurality of elongated rotor-support arms extending outwardly and forwardly from said central portion, each said rotor bearing being mounted on one of said arms, and tension means interconnecting the outward ends of said arms to restrain said arms from rearward movement.

20. Apparatus as set forth in claim 19 and further including means restraining each rotor bearing against twisting movement relative to the rotor-support arm on which it is mounted, a plurality of sockets fixed to said central frame portion, said rotor-support arm being mounted in one of said sockets for rotation of said arm therein about the axis of said arm, and means for locking said arms to said sockets to prevent such rotation.

21. Apparatus as set forth in claim 19, wherein the hub of each rotor extends substantially forwardly of the plane of the rim associated therewith, and wherein said rotor includes rigidifying and truing means extending from the forward end of said hub outwardly and rearwardly thereof to outer portions of said rotor to restrain said rim against rearward movement relative to said hub.

22. Apparatus as set forth in claim 19 and further including:
a support cradle,
means for mounting said central frame portion for pivotal movement on said cradle about a horizontal axis lying in a plane normal to said drum axis,
interengageable stop members carried by said frame and said cradle for limiting pivotal movement of said frame such that the center of said drum is always at a level above said horizontal pivot axis and the center of gravity of said frame and elements carried thereby is always forward of said horizontal pivot axis.

23. Apparatus as set forth in claim 22 and further including damper means connected between said frame and said cradle for allowing free upward pivotal movement of said frame relative to said cradle and for yieldably retarding downward pivotal movement of said frame relative to said cradle.

24. Apparatus as set forth in claim 1, wherein for each rotor, each blade comprises a metal spar tube and a thin-gauge, metal, airfoil-shaped sleeve secured thereto, said tubes being connected at one end to said rim and at the other end to said hub at a position thereof offset from the axis of said hub, and wherein a line passing through said hub axis and parallel to said spar tube passes through said blade approximately half the distance between the leading and trailing edges of said blade.

25. Apparatus as set forth in claim 1, wherein each rotor has six blades, each blade comprising a metal spar tube and an airfoil-shaped sleeve secured thereto, said spar tube being centered one-fourth of the chord distance of said blade from the leading edge thereof, wherein said hub has an outwardly extending radial flange thereon provided with six bolt holes equidistant from each other and from the axis of said hub, said spar tubes each being bolted to said flange by bolts passing through two adjacent of said holes, and wherein a line passing through said hub axis parallel to any one of said spar tubes is spaced from the axis of said spar tube by approximately one-fourth the chord distance of said blade.

26. Apparatus as set forth in claim 1, and further including:
(e) an electric generator mounted on said frame and driven by said power take-off drum,
(f) a vertically disposed elongated outer support tube,
(g) a vertically disposed elongated inner tube depending from said frame and mounted within said outer tube for rotation therein and relative thereto about a common vertical axis,
(h) means responsive to changes in wind direction for rotating said frame and inner tube about said vertical axis to maintain said rotors facing into the wind,
(i) an electric cable connected to said generator and extending downwardly through and beyond said inner tube, said cable being loosely coiled aout said vertical axis throughout a substantial portion of its length.

27. Apparatus as set forth in claim 26, wherein said cable is coiled throughout a substantial length of said inner tube, and wherein the outer diameter of the coils of said cable is slightly less than the inside diameter of said inner tube, and further including means for clamping said cable to the upper end of said inner tube and to the outer tube at a point below said inner tube.

28. In a wind-driven generator:

(a) a frame,
(b) a plurality of forwardly facing wind-intercepting rotors mounted on said frame,
(c) an electric generator mounted on said frame,
(d) means for driving said generator in response to rotation of said rotors,
(d) a vertically disposed elongated outer tube,
(f) a vertically disposed elongated inner tube mounted within said outer tube for rotation therein and relative thereto about a vertical axis,
(g) means mounting said frame on the upper end of said inner tube for rotation therewith about said vertical axis,
(h) means responsive to changes in wind direction for rotating said frame about said vertical axis to maintain said rotors facing into the wind,
(i) an electric cable connected to said generator and extending downwardly through said inner tube, said cable being loosely helically coiled about said vertical axis throughout a substantial portion of its length.

29. Apparatus as set forth in claim 28, wherein said cable is coiled throughout a substantial length of said inner tube, and wherein the outer diameter of the coils of said cable is slightly less than the inside diameter of said inner tube, and further including means for clamping said cable to the upper end of said inner tube and to the outer tube at a point below said inner tube.

30. In a wind-driven generator:
(a) a frame;
(b) a forwardly-facing wind-intercepting rotor having a hub, a circular rim coaxial with said hub and a plurality of blades extending radially from said hub to said rim;
(c) a power take-off drum rotationally mounted on said frame, said drum having a peripheral surface, the rim of said rotor being in tangential driving engagement with said peripheral surface of said drum;
(d) means for rotatably mounting said rotor on said frame and for pressing the rotor rim against said drum in response to presence of force exerted upon the upward side of said rotor and with a reduced force that varies as a positive function of said wind force.

* * * * *

UNITED STATES PATENT OFFICE
CERTIFICATE OF CORRECTION

Patent No. 4,110,631        Dated August 29, 1978

Inventor(s) Edmund L. Salter

It is certified that error appears in the above-identified patent and that said Letters Patent are hereby corrected as shown below:

Column 1, line 18, "may" should read -- many --.

Column 1, line 53 change the word "inn" to --in--

Column 2, line 7; add the word --tip-- after the word low and before the word speed.

Column 2, line 40 change the word "proporational" to --proportional--

Column 2, line 60 change the word "sippage" to --slippage--

Column 14, line 58 change the word "aout" to --about--

Signed and Sealed this

Fifth Day of June 1979

[SEAL]

Attest:

RUTH C. MASON
Attesting Officer

DONALD W. BANNER
Commissioner of Patents and Trademarks